S. E. ANTHONY.
Potato Digger.

No. 107,433.　　　　　Patented Sept. 20, 1870.

Witnesses:
Victor Hagmann
Chas. A. Pettit

Inventor:
S. E. Anthony
per Munn & Co.
Attorneys.

UNITED STATES PATENT OFFICE.

SHERMAN E. ANTHONY, OF STILLWATER, NEW YORK.

IMPROVEMENT IN POTATO-DIGGERS.

Specification forming part of Letters Patent No. 107,433, dated September 28, 1870; antedated September 10, 1870.

*To all whom it may concern:*

Be it known that I, SHERMAN E. ANTHONY, of Stillwater, in the county of Saratoga and State of New York, have invented a new and Improved Potato-Digger; and I do hereby declare that the following is a full, clear, and exact description of the construction and operation of the same, reference being had to the accompanying drawings, making a part of this specification, in which—

Figure 1:
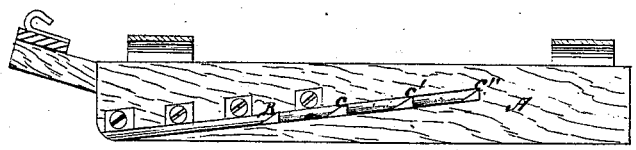
Figure 2:
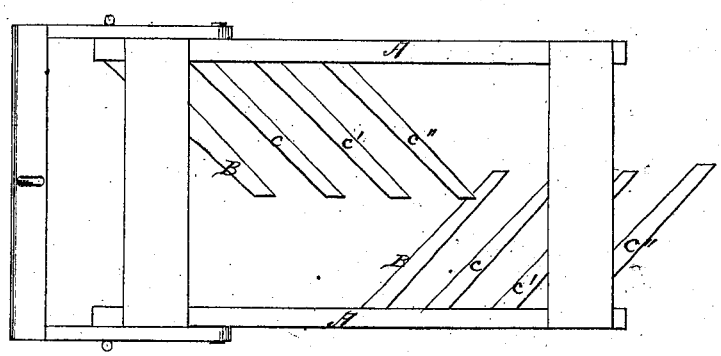

Figure 1 is a longitudinal vertical section, and Fig. 2 is a plan view.

This invention has for its object to break up the hills in which potatoes lie during the period of their growth, and to separate the roots from such broken-up earth.

To this end the invention consists in two share-tines projecting horizontally inward and slanting backward from the opposite sides of the drag-frame, and placed one in rear of the other, so as to leave room for obstructions to pass between them, each share-tine being combined with a series of parallel separator-tines placed in rear of it, each separator-tine being a little higher than the one in front of it.

In the drawings, A A are the parallel sides of the drag-frame. B B are the front share-tines, having sharp front edges and inclined upper sides, and slanting backward from the side bars, A, to which the outer ends of all the tines are secured by screws. One of the tines B is placed in rear of the other, so as to leave room for roots and other obstructions to pass between them. The share-tines break up the hills, running under the clusters of potatoes, and lifting them and the earth upward, and rolling the mass over upon the separator-tines following in the rear. The potatoes having been raised from their former level, the first separator-tine, $c$, is placed a little higher than the share-tine, so as to strike the roots and roll them over above it, to be in turn struck by the next higher separator-tine, $c'$, and so on until they are left on the surface of the soil in rear of the machine.

There may be as many sets of tines placed alternately with respect to each other as desired.

Having thus described my invention, what I claim as new, and desire to secure by Letters Patent, is—

The combination of the share-tine B and separator-tines $c\ c'\ c''$ on one side of the drag-frame, with the share-tine B and separator-tines $c\ c'\ c''$ on the other side of the drag-frame, the tines in each series being parallel and gradually ascending from the share-tine, and the two series being placed with respect to each other in the manner specified, and for the purpose set forth.

To the above specification of my invention I have signed my hand this 2d day of December, 1869.

S. E. ANTHONY.

Witnesses:
   CHAS. A. PETTIT,
   SOLON C. KEMON.